United States Patent
Fong et al.

(10) Patent No.: US 11,429,434 B2
(45) Date of Patent: Aug. 30, 2022

(54) ELASTIC EXECUTION OF MACHINE LEARNING WORKLOADS USING APPLICATION BASED PROFILING

(71) Applicant: International Business Machines Corporation, Armonk, NY (US)

(72) Inventors: Liana Fong, Irvington, NY (US); Seetharami R. Seelam, Chappaqua, NY (US); Ganesh Venkataraman, White Plains, NY (US); Debashish Saha, White Plains, NY (US); Punleuk Oum, Tarrytown, NY (US); Archit Verma, New York, NY (US); Prabhat Maddikunta Reddy, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 16/724,613

(22) Filed: Dec. 23, 2019

(65) Prior Publication Data

US 2021/0191759 A1 Jun. 24, 2021

(51) Int. Cl.
*G06F 9/50* (2006.01)
*G06N 20/00* (2019.01)
*G06F 9/48* (2006.01)

(52) U.S. Cl.
CPC .............. *G06F 9/4881* (2013.01); *G06F 9/50* (2013.01); *G06N 20/00* (2019.01); *G06F 2209/482* (2013.01); *G06F 2209/508* (2013.01)

(58) Field of Classification Search
CPC .......... G06F 9/4881–50; G06F 2209/482–508; G06N 20/00
See application file for complete search history.

(56) References Cited

U.S. PATENT DOCUMENTS 8,631,458 B1  1/2014  Banerjee
9,576,240 B2  2/2017  Jeong et al.
(Continued)

FOREIGN PATENT DOCUMENTS

CN        110168495 A      8/2019

OTHER PUBLICATIONS

Optimus: An Efficient Dynamic Resource Scheduler for Deep Learning Clusters Yanghua Peng, Yixin Bao, Yangrui Chen, Chuan Wu, (Year: 2018).*
(Continued)

*Primary Examiner* — Emerson C Puente
*Assistant Examiner* — Paul V Mills
(74) *Attorney, Agent, or Firm* — Lieberman & Brandsdorfer, LLC

(57) ABSTRACT

Embodiments relate to a system, program product, and method for supporting elastic execution of a machine learning (ML) workload using application based profiling. A joint profile comprised of both ML application execution and resource usage data is generated. One or more feature(s) and signature(s) from the joint profile are identified, and a ML execution model for ML application execution and resource usage is built. The ML execution model leverages the feature(s) and signature(s) and is applied to provide one or more directives to subsequent application execution. The application of the ML execution model supports and enables the ML execution to elastically allocate and request one or more resources from a resource management component, with the elastic allocation supporting application execution.

20 Claims, 7 Drawing Sheets

(56) References Cited

U.S. PATENT DOCUMENTS

| | | | |
|---|---|---|---|
| 10,140,164 B2 | 11/2018 | Mehta et al. | |
| 10,171,313 B2 | 1/2019 | Diaz et al. | |
| 10,223,166 B2 | 3/2019 | Jamjoom et al. | |
| 10,223,762 B2 | 3/2019 | Ashari et al. | |
| 2015/0113530 A1 | 4/2015 | Arcese | |
| 2015/0242483 A1 | 8/2015 | Zhou et al. | |
| 2015/0310335 A1* | 10/2015 | Fan | G06F 30/20 706/12 |
| 2017/0017576 A1 | 1/2017 | Cammarota | |
| 2017/0192825 A1 | 7/2017 | Biberman et al. | |
| 2017/0220942 A1* | 8/2017 | Baldini Soares | G06N 20/10 |
| 2017/0331763 A1 | 11/2017 | Li et al. | |
| 2018/0024868 A1* | 1/2018 | Mehta | G06F 16/24569 718/104 |
| 2018/0107464 A1* | 4/2018 | Johnson | G06F 8/4441 |
| 2018/0139271 A1* | 5/2018 | Kumar | G06F 9/505 |
| 2018/0332107 A1* | 11/2018 | Marr | H04L 67/1008 |
| 2019/0095785 A1* | 3/2019 | Sarkar | G06N 20/00 |
| 2019/0139185 A1 | 5/2019 | Baggerman | |
| 2019/0197435 A1* | 6/2019 | Kobayashi | G06N 5/003 |
| 2019/0258964 A1* | 8/2019 | Dube | G06N 20/00 |
| 2019/0325307 A1* | 10/2019 | Li | G06N 3/08 |
| 2019/3032111 | 10/2019 | Dias | |
| 2020/0117508 A1* | 4/2020 | Subramanian | G06Q 10/06313 |
| 2020/0183936 A1* | 6/2020 | Ramesh | G06N 20/00 |
| 2020/0327448 A1* | 10/2020 | Yakovlev | G06N 5/003 |

OTHER PUBLICATIONS

Intelligent Resource Scheduling at Scale: a Machine Learning Perspective Renyu Yang, Xue Ouyang, Yaofeng Chen, Paul Townend4, Jie Xu (Year: 2018).*

On the use of machine learning to predict the time and resources consumed by applications Andréa Matsunaga and José Fortes (Year: 2010).*

Al Gauge: Runtime Estimation for Deep Learning in the Cloud Parijat Dube, Tonghoon Suk, Chen Wang (Year: 2019).*

Task Runtime Prediction in Scientific Workflows Using an Online Incremental Learning Approach Muhammad Hafizhuddin Hilman, Maria A. Rodriguez and Rajkumar Buyya (Year: 2018).*

"Training Data" Definition Techopedia Technology Dictionary www.techopedia.com/definition/33181/training-data (Year: 2022).*

What is supervised learning? IBM Cloud Education www.ibm.com/cloud/learn/supervised-learning (Year: 2020).*

QoS-Aware Machine Learning-based Multiple Resources Scheduling for Microservices in Cloud Environment Lei Liu (Year: 2019).*

Qiao, A., et al., "Litz: Elastic Framework for High-Performance Distributed Machine Learning", Usenix: the Advanced Computing Systems Association, 2018 USENIX Annual Technical Conference, pp. 631-643, Jul. 11-13, 2018.

Da Rosa Righi, R., et al., "Towards Cloud-based Asynchronous Elasticity for Iterative HPC Applications", XV Brazilian Symposium on High Performance Computational Systems (WSCAD 2014), Journal of Physics: Conference Series 649 (2015).

Feng, D., et al., "ERP: An Elastic Resource Provisioning Approach for Cloud Applications", PLos ONE 14(4): e0216067, Apr. 26, 2019.

Huu, T., et al., "Joint Elastic Cloud and Virtual Network Framework for Application Performance-cost Optimization", Journal of Grid Computing, Springer Verlag, 2011, 9 (1), pp. 27-47.

Rasley, J., et al., "HyperDrive: Exploring Hyperparameters with POP Scheduling", Proceedings of Middleware '17, Las Vegas, NV, USA, Dec. 11-15, 2017, 13pages.

Andresen, D., et al., "Machine Learning for Predictive Analytics of Compute Cluster Jobs", International Conference on Scientific Computing, CSC'18, pp. 40-46, 2018.

Mulder, J. D., "A Survey of Computational Steering Environments", Elsevier Science, Jul. 10, 1998.

Souza, R., et al. "Towards a Human-in-the-Loop Library for Tracking Hyperparameter Tuning in Deep Learning Development", LADaS 2018, Latin America Data Science Workshop, pp. 84-87.

Smith, S., et al. "Don't Decay the Learning Rate, Increase the Batch Size", ICLR 2018, arXiv:1711.00489v2, Feb. 24, 2018.

Qi, H., et al., "Paleo: A Performance Model for Deep Neural Networks", ICLR 2017.

Simon, Julien, "Keras shoot-out, part 2: a deeper look at memory usage", Sep. 8, 2017.

PCT International Search Report and Written Opinion, PCT/IB2020/061886, dated Mar. 23, 2021.

\* cited by examiner

ELASTIC EXECUTION OF MACHINE LEARNING WORKLOADS USING APPLICATION BASED PROFILING

BACKGROUND

The present embodiments relate to training a machine learning model to profile execution of machine learning workloads. More specifically, the embodiments relate to generating a joint profile of application execution and resource usage, and utilizing an execution model encapsulated in the trained machine learning model to interact with a resource management system to support machine learning application execution and corresponding performance.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificially intelligent computer systems, natural language systems (such as the IBM Watson® artificially intelligent computer system or other natural language interrogatory answering systems) process natural language based on system acquired knowledge. To process natural language, the system may be trained with data derived from corpuses of knowledge, but the resulting outcome can have different degrees of accuracy for a variety of reasons.

Machine learning (ML), which is a subset of Artificial intelligence (AI), utilizes algorithms to learn from data and create foresights based on this data. ML is the application of AI through creation of models, including neural networks that can demonstrate learning behavior by performing tasks that are not explicitly programmed. ML workloads require large data sets, fast and parallel access to the data, and algorithms for training to support leanings. Examples of hardware to support the ML workloads include, but are not limited to, accelerators such as graphics processing units (GPUs), central processing units (CPUs) infrastructures, and storage solutions. Resource usage characteristics for ML workloads have resource profiling that is usually collected for debugging and execution timing studies. The resource profiling collections currently use timing framework independent of application or workload execution. It would be advantageous to have joint profiling of workload execution and resource usage using the same timing framework for improved correlation of workload execution and resource usage. Moreover, the joint profiling would enable fine-grained correlation such as at task levels or at iteration levels with different sets of ML parameters. Accordingly, with the appropriate amount resources to support ML workloads, joint profiling may be an avenue to support effective and efficient usage of resources and workload execution.

SUMMARY

The embodiments include a system, computer program product, and method for employing an artificial intelligence platform to fuse efficient and effective ML application execution with computing resource allocation.

In one aspect, a system is provided for use with an artificial intelligence (AI) platform to train and maintain an ML application execution modeler to elastically execute machine learning workloads using application based profiling. As shown, the system is provided with a processing unit, e.g. processor, operatively coupled to memory, and the AI platform in communication with the processing unit. The AI platform is embedded with tools in the form of a profile manager, a ML manager, and a director. The profile manager functions to generate a joint profile comprised of both ML application execution and resource usage data. The ML manager functions to identify one or more features and signatures from the joint profile, and to build a ML execution model for ML application execution and resource usage. The ML execution model leverages the feature(s) and signature(s). The director functions to apply the ML execution model and provide one or more directives to subsequent application execution. The application by the director supports and enables the ML execution to elastically allocate and request one or more resources from a resource management component, with the elastic allocation supporting application execution.

In another aspect, a computer program product is provided to support elastic execution of a ML workload using application based profiling. The computer program product includes a computer readable storage medium having program code embodied therewith, with the program code executable by a processor to train and maintain an ML application execution modeler to elastically execute ML workloads using application based profiling. Program code is provided to generate a joint profile comprised of both ML application execution and resource usage data. Program code is provided to identify one or more features and signatures from the joint profile, and to build a ML execution model for ML application execution and resource usage. The ML execution model leverages the feature(s) and signature(s). Program code applies the ML execution model and provides one or more directives to subsequent application execution. Application of the program code supports and enables the ML execution to elastically allocate and request one or more resources from a resource management component, with the elastic allocation supporting application execution.

In yet another aspect, a method is provided for supporting elastic execution of a ML workload using application based profiling, including training and maintaining an ML execution model to elastically execute ML workloads using application based profiling. A joint profile comprised of both ML application execution and resource usage data is generated. One or more features and one or more signatures from the joint profile are identified, and a ML execution model for ML application execution and resource usage is built. The ML execution model leverages the feature(s) and signature(s). The ML execution model is applied and provides one or more directives to subsequent application execution. The application of the ML execution model supports and enables the ML execution to elastically allocate and request one or more resources from a resource management component, with the elastic allocation supporting application execution.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
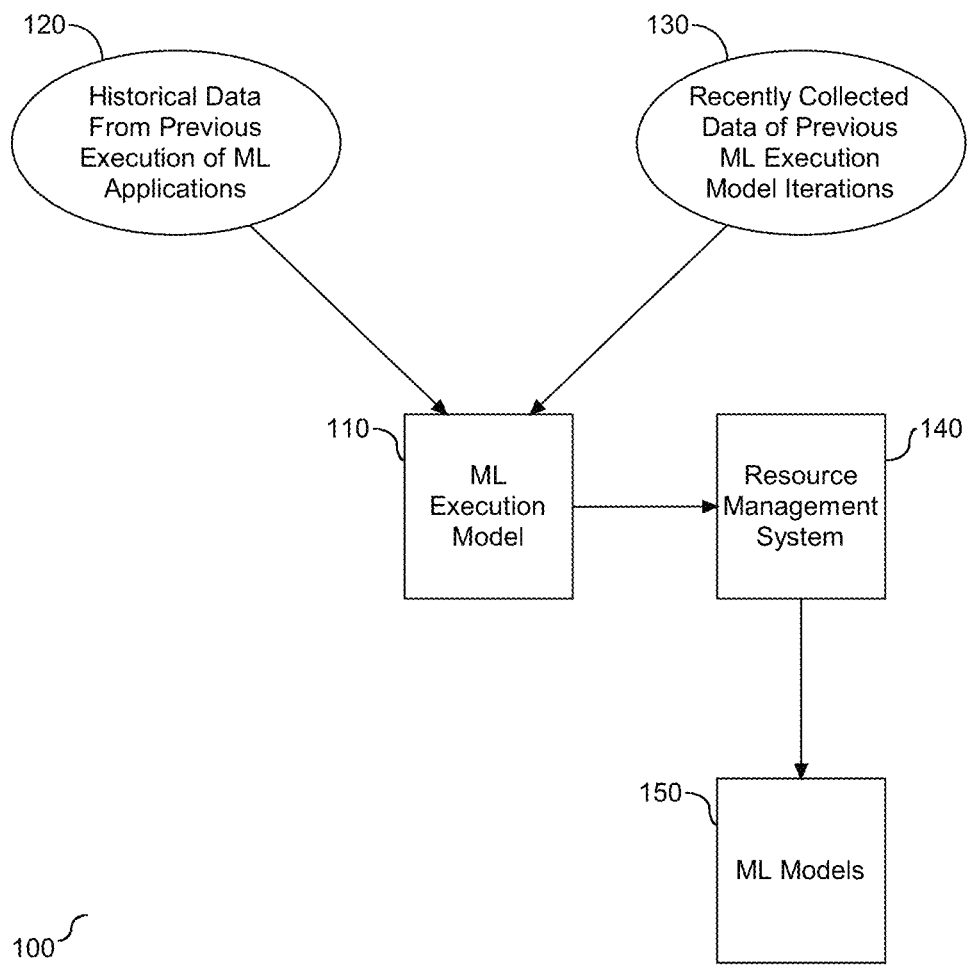
FIG. 1 depicts a block diagram to illustrate an overview of a ML joint profile to support efficient execution of ML applications with effective use of resources.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Machine learning follows a process of preparing data, training an algorithm and generating a machine learning model, and then making and refining predictions. Machine learning models generally fall into one of the following basis categories: supervised machine learning, unsupervised machine learning, reinforcement machine learning, and deep learning. For example, deep learning employs neural networks as models of the way the human brain processes information. Basic units of the neural networks are referred to as neurons, which are typically organized into layers. The neural network works by simulating a large number of interconnected processing units that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. Eventually, a result is delivered from the output layers. Deep learning complex neural networks are designed to emulate how the human brain works, so computers can be trained to support poorly defined abstractions and problems. Neural networks and deep learning are often used in image recognition, speech, and computer vision applications. Machine learning can learn and create foresights based on data. Machine learning may also use the joint profiling data to gain insights on effective allocation of resources at fine-grained interval to affect efficient workload execution.

It is understood that ML models have extensive hardware requirements to properly support the processing needs of the models. Examples of such hardware resource requirements include, but are not limited to, RAM, disk space, GPUs, and CPUs. Management of the resources may be allocated to support sharing of the resources among a plurality of ML models. As shown and described herein, and demonstrated in the drawings, ML workload information is correlated with resource information to properly allocate the resources to support application execution. Resource usage on ML routines is monitored and collected during execution, which are then used for prediction and allocation of resources for subsequent ML workloads. Accordingly, ML techniques are utilized for resource allocation for subsequent ML workloads.

Referring to FIG. 1, a block diagram (100) is provided to illustrate an overview of a ML joint profile to support efficient execution of ML applications with effective use of resources. As shown, an ML execution model (110) is developed for ML application execution and resource usage. The ML execution model (110) uses machine learning techniques for learning, predicting and allocating resources for other ML applications. More specifically, the ML execution model (110) is a performance prediction model based on ML techniques. The execution model is built using historical data from previous execution of the ML applications (120) and from recently collected data of previous ML execution model iterations (130). The functionality of the ML execution model (110) is to correlate application execution performance with appropriate computing resources. As shown herein, the ML execution model (110) interacts with a resource management system (140) to effectively and efficiently direct resources to one or more ML models for application execution (150). Accordingly, as shown herein, the ML execution model (110) functions as a component to generate or collect the joint profile of applications and resource management.

Figure 2:
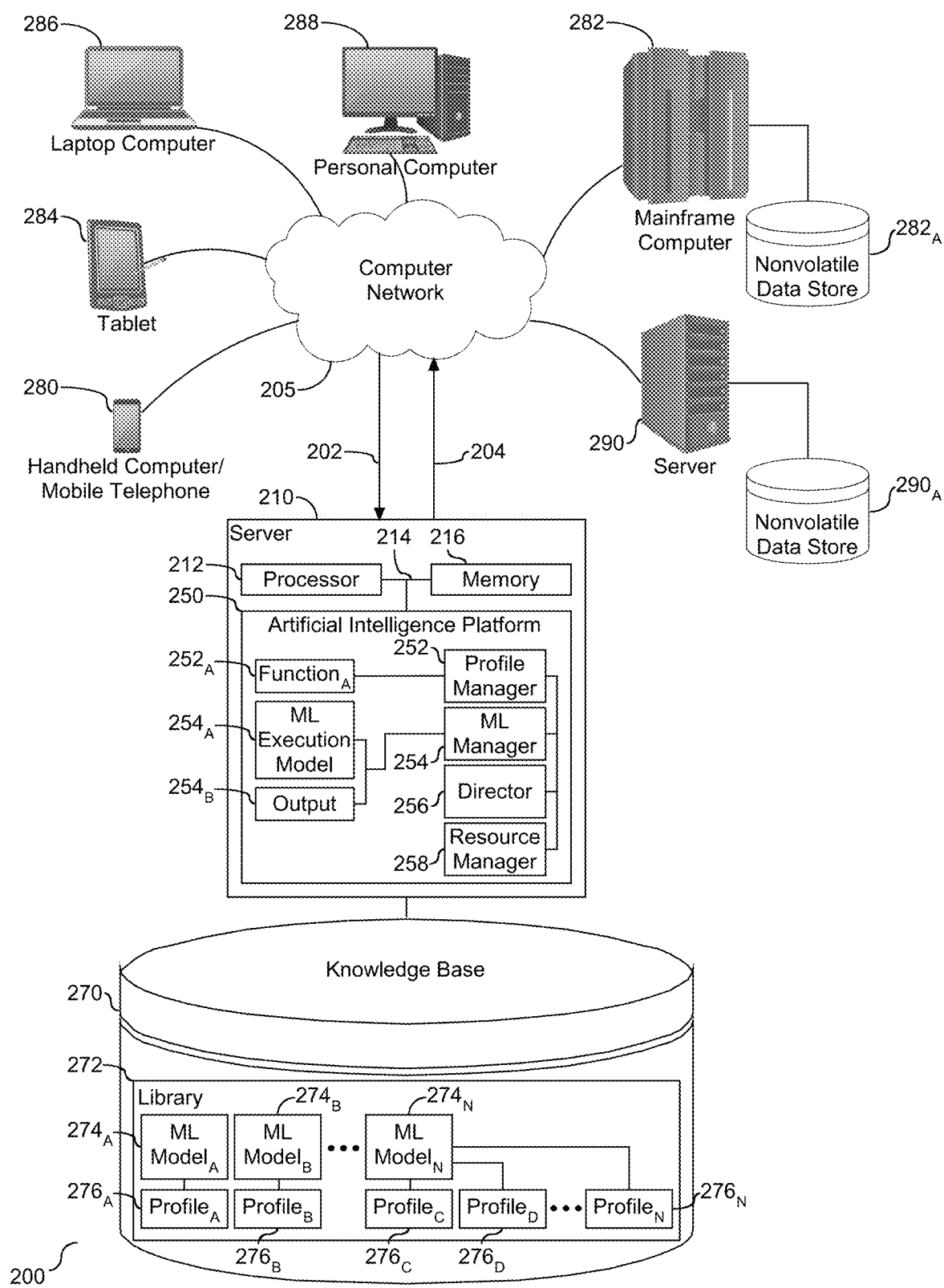
FIG. 2 depicts a schematic diagram of a computer system with an artificial intelligence platform to support efficient execution of ML program and effective allocation and use of computing resources.

Referring to FIG. 2, a schematic diagram of a computer system (200) with an artificial intelligence platform to support efficient execution of ML program and effective allocation and use of computing resources is depicted. As shown, a server (210) is provided in communication with a plurality of computing devices (280), (282), (284), (286), (288), and (290) across a network connection (205). The server (210) is configured with a processing unit (212), e.g. processor, in communication with memory (216) across a bus (214). The processor can be a CPU or a GPU. The server (210) is shown with an artificial intelligence (AI) platform (250) to support collaboration to train a machine learning model as a joint profile of application execution and resource usage. The computing devices (280), (282), (284), (286), (288), and (290) communicate with each other and with other devices or components via one or more wired and/or wireless data communication links, where each communication link may comprise one or more of wires, routers, switches, transmitters, receivers, or the like. In this networked arrangement, the server (210) and the network connection (205) enable communication detection, recognition, and resolution. Other embodiments of the server (210) may be used with components, systems, sub-systems, and/or devices other than those that are depicted herein.

The AI platform (250) is shown herein configured to receive input (202) from various sources. For example, AI platform (250) may receive input from the network (205) and leverage a data source (270), also referred to herein as a corpus or knowledge base, to create output or response content. The AI platform (250) is provided with tools to support and enable machine learning collaboration and to elastically execute machine learning workloads used application based profiling.

The AI platform (250) functions as a platform to enable and support collaboration between application execution and resource allocation and management. In one embodiment, the AI platform (250) communicates response output to members operatively coupled to the server (210), such as one or more of the computing devices (280)-(290) across the network (205).

The AI platform (250) is shown herein with several tools to support neural model collaboration, including a profile manager (252), a machine learning (ML) manager (254), a director (256), and a resource manager (258). The profile manager (252) functions to generate or collect a joint profile comprised of ML application execution and resource usage. The joint profile combines ML application execution details and resource usage data corresponding to ML execution. Examples of ML application execution details include, but are not limited to batch size, learning rate, iteration number, model accuracy, etc. Examples of resources include, but are not limited to a quantity of CPUs utilized, CPU type, quantity of GPUs utilized, GPU types, etc. The profile manager (252) monitors or receives signals from ML profiles and collects resource usage by corresponding ML model, and in one embodiment ML routines that are part of the ML model. More specifically, it is understood in the art, the ML model building or training and corresponding ML routines within the ML model require use of computing resources, including physical and virtual resources, in order to support the routine functionality and corresponding processing. The profile manager (252) collects data associated with these resources and associated resource consumption from the corresponding ML model, and ML routines that are part of the ML model. The collected data is employed to predict resource allocation for subsequent ML application execution, whether the subsequent application be the same, increased, or decreased in comparison, or with different set of parameters or configurations to a current workload. As shown herein, the profile manager (252) utilizes at least one call-back, shown herein as call-back function$_A$ (252$_A$), to profile application execution with one or more relevant parameters and to profile resource usage information. In one embodiment, creation of a profile of resource usage information is an identification, and in one embodiment an outline, of computing resources that are used or required to support execution of an application. Accordingly, the profile manager (252) functions to capture characteristics of computing resources used and usage along with the application execution with its set of parameters.

As shown herein, the server (210) is operatively coupled to the data source (270). The data source (270) is shown herein with a library (272) of ML models resulted from ML applications. Although only one library is shown, it is understood that the data source (270) may be configured with multiple libraries, and the library (272) is for illustrative purposes. The library (272) is shown with ML models, including ML model$_A$ (274$_A$) and ML model$_B$ (274$_B$). The quantity of ML models is for illustrative purposes and should not be considered limiting. In one embodiment, the ML models are organized in the library based on subject matter or functionality. Each of the ML models is shown with an operatively coupled or associated profile, also referred to herein as a joint profile. More specifically, ML model$_A$ (274$_A$) is shown with profile$_A$ (276$_A$) and ML model$_B$ (274$_B$) is shown with profile$_B$ (276$_B$). The ML models (274$_A$) and (274$_B$) in the library (272) do not necessarily couple with one particular profile. ML models can be built with multiple joint profiles. For example, as shown ML model$_N$ (274$_N$) is shown as a combination of profiles, e.g. a combination of profile$_x$ (276$_C$), profile$_y$ (276$_D$), and profile$_N$ (276$_N$). Each profile combines execution of the corresponding or operatively coupled model and resource usage or requirements to support execution of the operatively coupled model. For example, in one embodiment, the ML model may be built with the same parameters but different set of computing resources. While the resulting model is the same, a finished model converging timing would be different due to resource constraints.

The ML manager (254), shown herein operatively coupled to the profile manager (252), functions to identify one or more features and signatures from the profile, e.g. (276$_A$) and (276$_B$). Examples of features and signatures are machine learning frameworks, learning batch sizes, number of CPUs allocated, size of memory used, execution time for each iteration, or algorithmic convergence time. The ML manager (254) is shown herein with an operatively coupled ML execution model (254$_A$). More specifically, the model (254$_A$) is a ML model that uses ML technology to predict computing resource usage for ML application execution. The ML manager (254) builds and manages the model (254$_A$), and executes the model (254$_A$) to assess and predict computing resource requirements for a corresponding ML model, e.g. (274$_A$) by leveraging one or more features and signatures from the corresponding profile, e.g. (276$_A$). In one embodiment, the identification of features and characteristics, e.g. signatures, for the generation of the joint profile and building of the ML model (254$_A$) is derived with user input. Accordingly, the ML manager (254) functions to create a ML model that models functionality and processing of other ML models, such as models (274$_A$) and (274$_B$), to facilitate computing resource allocation to support ML model processing.

The director (256) functions to apply the ML execution model (254$_A$), and utilize output (254$_B$) from the model to provide directives to subsequent application execution. The output (254$_B$) is in the form of computing resources required to support efficient and effective execution of one or more of ML applications. The allocation of resources is elastic, e.g. dynamic, and subject to change during execution. The director (256) utilizes the output (254$_B$) based on the ML execution model (254$_A$) to elastically allocate and request one or more computing resources from a resource management component to support application execution. As shown herein, a resource manager (258) is shown operatively coupled to the director (256). In one embodiment, the output (254$_B$) is forwarded to the resource manager (258) with a directive to indicate computing resources and designation of the resources to support application execution. As discussed herein, the resource allocation is defined as elastic, e.g. non-static. Similarly, the directive corresponding to the output (254$_B$) is in the form of a resource allocation action.

The ML execution model ($254_A$) executes the resource allocation action, e.g. directive, to request available resources to support application processing. The resource allocation action may reduce or expand resources with respect to prior application processing and execution, or in one embodiment the resource allocation action may maintain the resource request. Similarly, the requested resources have corresponding attributes. The resource allocation action identifies the resource attributes to support application processing and execution, which similar to the resource allocation is elastic. Accordingly, the director (256) functions to support and process output from the ML model ($254_A$).

Iteration is a term used in ML applications and indicates the number of times the algorithm parameters are updated. Training of a corresponding neural network requires multiple iterations. With respect to the functionality described herein, the computing resource allocation may change across the iterations based on the requirements of the ML execution models as well as availability of the resources. The ML execution model ($254_A$) is responsive to the dynamic characteristics and iterations of the ML models, and the corresponding output ($254_B$) reflects this dynamic nature. The director (256) may change the computing resource allocations across the ML application iterations. In one embodiment, resource allocation changes may be based on application execution patterns, resource usage patterns, or a combination of both. Any changes to the resource allocation are reflected in the output ($254_B$) across the ML model iterations, and the corresponding resource allocation action, e.g. directive.

In some illustrative embodiments, server (210) may be the IBM Watson® system available from International Business Machines Corporation of Armonk, N.Y., may be augmented with the mechanisms of the illustrative embodiments described hereafter. The system shown and described herein includes tools to implement machine learning based on iterative optimization algorithms. The tools enable elastic execution of ML workloads using application based profiling, thereby effectively and efficiently allocating computing resource to ML applications and their corresponding neural networks, and across multiple iterations of the model building or training.

The profile manager (252), ML manager (254), director (256), and resource manager (258), hereinafter referred to collectively as AI tools or AI platform tools, are shown as being embodied in or integrated within the AI platform (250) of the server (210). The AI tools may be implemented in a separate computing system (e.g., 290) that is connected across network (205) to the server (210). Wherever embodied, the AI tools function to support and enable ML application execution modeling and corresponding elasticity of resource allocation in an iterative manner. Output ($254_A$) from the ML execution model (254) may be in the form of an executable directive forwarded to the resource manager (258) to direct and designate computing resources to support execution resulting one or more of the models ($274_A$) and ($274_B$).

Types of information handling systems that can utilize the AI platform (250) range from small handheld devices, such as handheld computer/mobile telephone (280) to large mainframe systems, such as mainframe computer (282). Examples of handheld computer (280) include personal digital assistants (PDAs), personal entertainment devices, such as MP4 players, portable televisions, and compact disc players. Other examples of information handling systems include pen, or tablet computer (284), laptop, or notebook computer (286), personal computer system (288), and server (290). As shown, the various information handling systems can be networked together using computer network (205). Types of computer networks (205) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (290) utilizes non-volatile data store ($290_A$), and mainframe computer (282) utilizes nonvolatile data store ($282_A$). The non-volatile data store ($282_A$) can be a component that is external to the various information handling systems or can be internal to one of the information handling systems.

The information handling system employed to support the AI platform (250) may take many forms, some of which are shown in FIG. 2. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
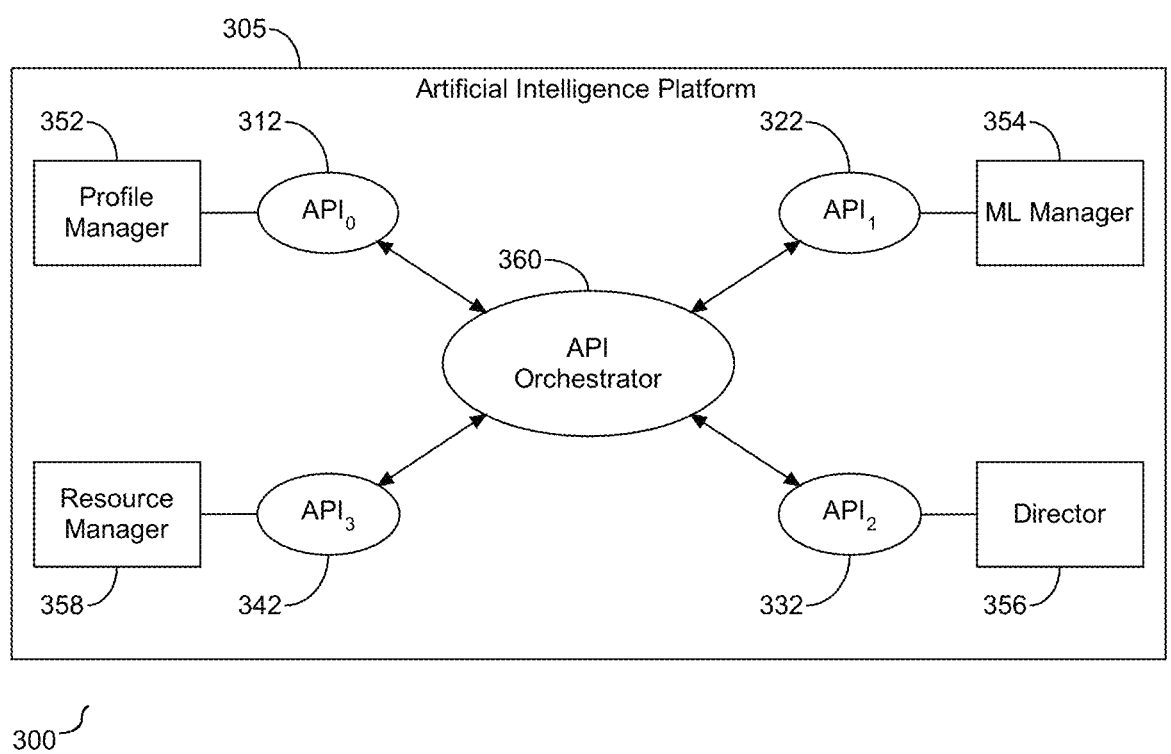
FIG. 3 depicts a block diagram illustrating the artificial intelligence platform and corresponding tools, as shown and described in FIG. 2, and their associated application program interfaces.

An Application Program Interface (API) is understood in the art as a software intermediary between two or more applications. With respect to the AI platform (250) shown and described in FIG. 2, one or more APIs may be utilized to support one or more of the tools (252)-(258) and their associated functionality. Referring to FIG. 3, a block diagram (300) is provided illustrating the tools (252)-(258) and their associated APIs. As shown, a plurality of tools are embedded within the AI platform (305), with the tools including the profile manager (352) associated with $API_0$ (312), the ML manager (354) associated with $API_1$ (322), the director (356) associated with $API_2$ (332), and the resource manager (358) associated with $API_3$ (342). Each of the APIs may be implemented in one or more languages and interface specifications. $API_0$ (312) provides functional support to generate the joint profile as a combination of application execution details and application execution resource usage; $API_1$ (322) provides functional support to build and maintain an ML execution model directed at characterizing and identifying ML application execution and computing resource usage; $API_2$ (332) provides functional support to elastically application and request computing resources based on output from the ML execution model; and $API_3$ (342) provides functional support to direct and designate computing resources to support execution resulting from one or more of the models and their corresponding neural networks.

As shown, each of the APIs (312), (322), (332), and (342) are operatively coupled to an API orchestrator (360), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs. In another embodiment, separate APIs can be processed in distributed computing resources to achieve elasticity, scalability and availability.

Figure 4:
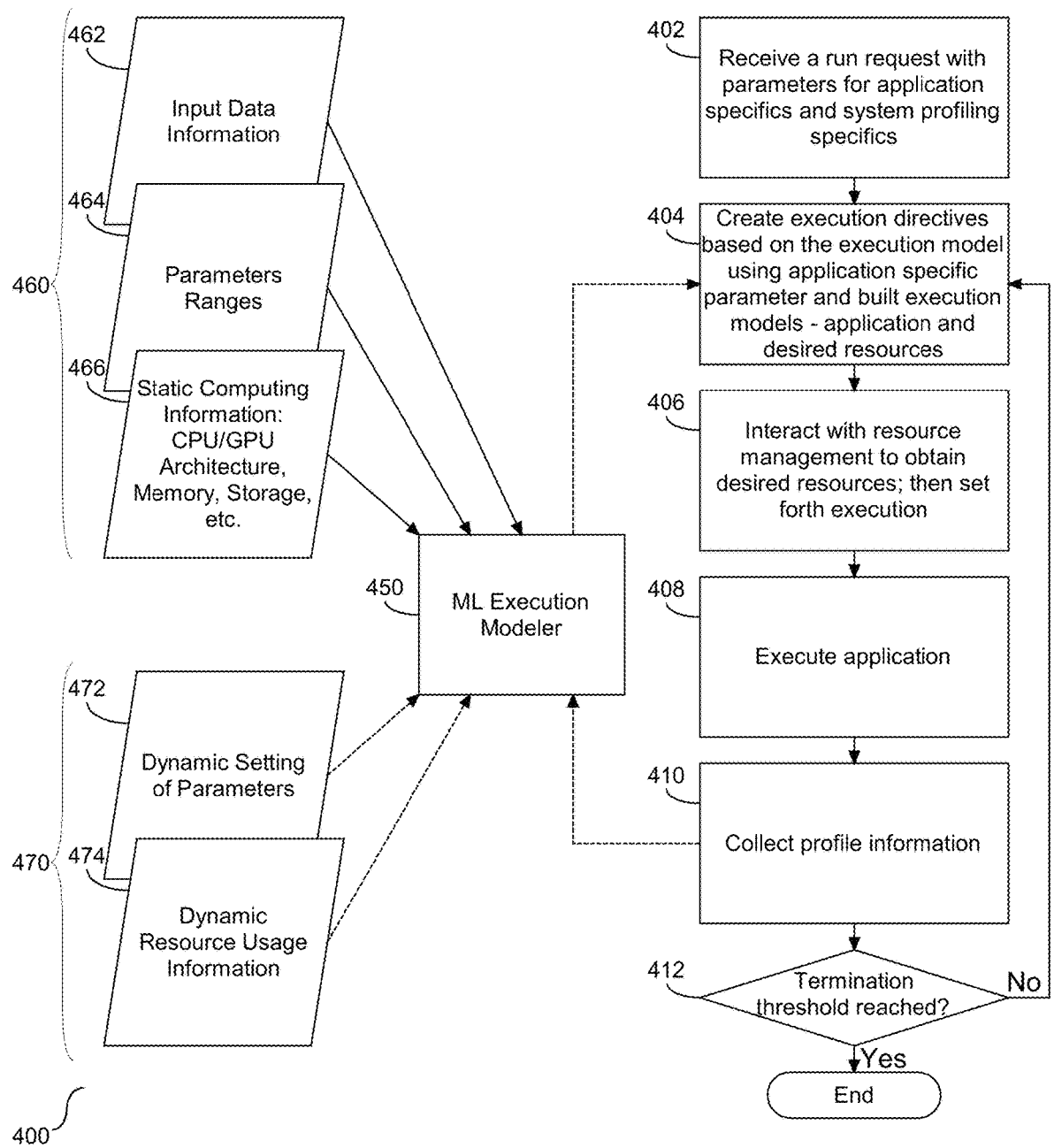
FIG. 4 depicts a flow diagram to illustrate a process for ML modeling and elasticity of computing resource allocation.

Referring to FIG. 4, a flow diagram (400) is provided to illustrate a process for ML modeling and elasticity of computing resource allocation. As shown, a request to execute an application, also know herein as a run request, with parameters for application specifics and system profiling specifics is received (402). Execution directives are created (404) based on the received request from step (402) and based on an ML execution modeler (450), which entails application parameters and historical processing of the model(s). In one embodiment, if no historical execution is known or available, user specified input may be solely utilized. Possible execution directives include, but are not limited to, setting limits of memory usage, and allocating resources for utilization. With respect to memory usage, limits may be set for application instances based on one or more previous iterations or historical data from one or more previous runs. With respect to resource utilization, previous historical data may contain information on resource utilization for the same tuning parameters of a training model but on a different computing platform, e.g. with different quantities of CPUs, CPU types, different quantities of GPUs, GPU types, and NVLink (wire based communication protocol) connectivity. These directives are for illustrative purposes and should not be considered limiting. Accordingly, the directives are created based on ML execution model and parameters corresponding to the run request.

The directives created at step (404) are employed to interact with resource management to obtain the desired resources to support the run request and to execute the resource allocation within the request parameters (406). More specifically, the directives obtained at step (404) are used to allocate computing resources. For example, in one embodiment, the allocation may be directed at a container of a designated size for execution with flexibility for potential dynamic expansion with respect to quantity of CPU core, CPU memory, GPU types, and quantity of GPUs. Similarly in one embodiment, the allocation may be directed at packing containers on the same machines, if possible or desirable. In another embodiment, the allocation may be directed at GPU sharing. After the resources have been allocated, one or more ML applications are executed (408) and profile information of the executed ML application(s) is collected (410). In one embodiment, the collection uses call-back functions on ML application specifics and resource usage information. The collected ML application execution data, which is referred to herein as dynamic application information, is communicated to the ML execution modeler (450). Following step (410) and the profile information collection, it is determined if a termination threshold has been reached (412). A negative response to the determination at step (410) is followed by a return to step (404), and a positive response concludes the profile collection and development process.

The ML execution modeler (450) receives input from application execution and interaction with resource management. The ML execution modeler (450) receives both static input data (460) and dynamic input data (470). The static input data is in the form of input data information (462), tuning parameter ranges (464), and static computing information, such as CPU and GPU architecture, memory, and storage (466). The dynamic input data (470) is in the form of setting of parameters (472) and resource usage information (474). Accordingly, the ML execution modeler (450) utilizes application execution information and resource information to identify optimal resources and build a prediction of requirement to support ML applications.

As shown in FIG. 4, call-back functions are utilized by the executed or executing ML application(s) to identify ML application data and ML application resource usage, thereby generating a joint profile of ML workloads and resource usage. In one embodiment, the joint profile may contain time-stamped data with ML application specific features or signatures and resource usage. The ML execution model built in ML execution modeler utilizes the generated joint profile(s) containing the application execution details. More specifically, the ML execution model is dynamic in that it receives and applies updates from the joint profile(s). The ML execution model is built using data from previous execution runs, or from recently collected data from previous iterations in the same run. The features and signatures contained in the joint profile(s) and dynamically applied updates within the joint profile(s) provide directives to subsequent application execution of iterations, and to correlate application execution performance with appropriate, and in one embodiment heterogeneous, computing resources. In one embodiment, a set of APIs are employed to support the call-back functions from the executed or executing ML applications. The set of APIs are callable from application in any ML framework. Accordingly, the joint profile(s) are employed to both build the ML execution model in the ML execution modeler, and once built the joint profile(s) are applied by the ML execution modeler to request effective resources from a resource management component for efficient execution of ML applications at various iterations.

The following is an example trace output from an API to capture details of how an application is running.
2018-05-17 02:51:34.288301 Running on machine with 28 cores and architecture type: x86_64
2018-05-17 02:51:34.288305 Running on CPU cores—[3] for this process: psutil.Process(pid=4954, name='python', started='22:51:26') CUDA_VISIBLE_DEVICES: [7]; Cuda V.: 384.81; Device [7] Type K80
2018-05-17 02:51:34.288301 batch size 1024
2018-05-17 02:51:34.288352 epoch 1 starts
2018-05-17 02:51:35.959277 CPU utilization: 68.4%×1 cores
2018-05-17 02:51:35.959277 CPU memory utilization: 1562587136(RSS) 567708688384(VMS)
2018-05-17 02:51:35.959277 GPU[7] total memory: 11995578368
2018-05-17 02:51:35.959277 GPU[7] used memory: 11485577216
2018-05-17 02:51:35.959277 GPU[7] utilization: 99%
2018-05-17 02:51:35.959277 GPU[7] memory utilization: 27%
2018-05-17 02:51:35.960202 Elapse time for epoch 1—0: 00:01.671845; accuracy—0.6077724358974359
As shown, the API captures details of how the application is running, including batch size, input information, data type, memory utilization, and time spent executing the ML application iteration. The API can be time or logic driven. Accordingly, the API shown in this example captures ML application execution data and resource usage, and communicates the captured data to the ML execution modeler for ML application directives for subsequent ML application iterations.

Aspects of the functional tools (252)-(258) and their associated functionality may be embodied in a computer system/server in a single location, or in one embodiment, may be configured in a cloud based system sharing computing resources. With references to FIG. 5, a block diagram (500) is provided illustrating an example of a computer system/server (502), hereinafter referred to as a host (502) in communication with a cloud based support system, to implement the processes described above with respect to FIGS. 1-4. Host (502) is operational with numerous other general purposed or special purpose computing system environments or configurations. Examples of well-known computing systems, environments, and/or configurations that may be suitable for use with host (502) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (502) may be described in the general context of computer system-executable instructions, such as program modules, being executed by a computer system. Generally, program modules may include routines, programs, objects, components, logic, data structures, and so on that perform particular tasks or implement particular abstract data types. Host (502) may be practiced in distributed cloud computing environments (580) where tasks are performed by remote processing devices that are linked through a communications network. In a distributed cloud computing environment, program modules may be located in both local and remote computer system storage media including memory storage devices.

Figure 5:
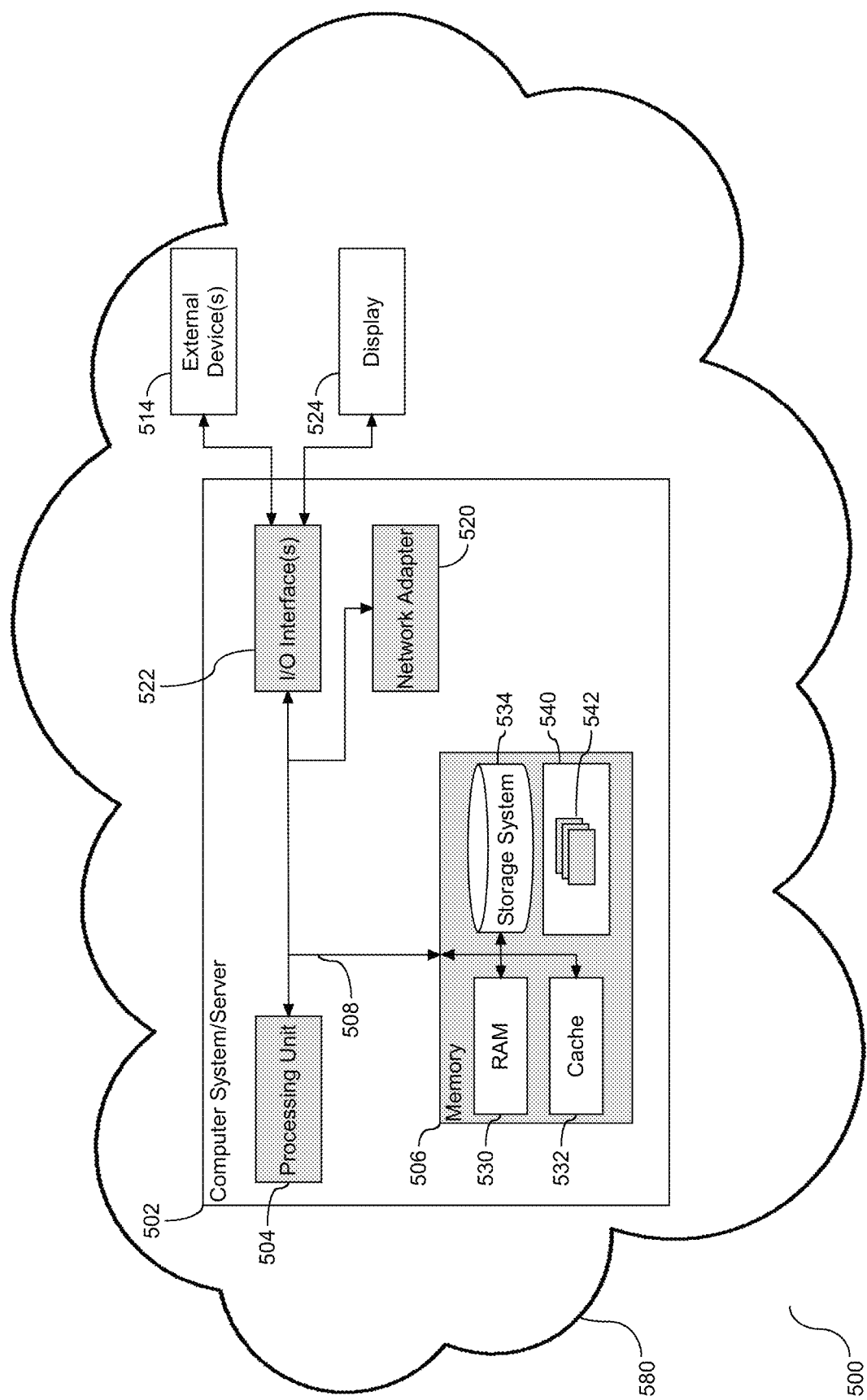
FIG. 5 depicts a block diagram illustrating an example of a computer system/server of a cloud based support system, to implement the system and processes described above with respect to FIGS. 1-4.

As shown in FIG. 5, host (502) is shown in the form of a general-purpose computing device. The components of host (502) may include, but are not limited to, one or more processors or processing units (504), e.g. hardware processors, a system memory (506), and a bus (508) that couples various system components including system memory (506) to processor (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (502) typically includes a variety of computer system readable media. Such media may be any available media that is accessible by host (502) and it includes both volatile and non-volatile media, removable and non-removable media.

Memory (506) can include computer system readable media in the form of volatile memory, such as random access memory (RAM) (530) and/or cache memory (532). By way of example only, storage system (534) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces.

Program/utility (540), having a set (at least one) of program modules (542), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. Program modules (542) generally carry out the functions and/or methodologies of embodiments to dynamically communication evaluation interrogatory identification and processing. For example, the set of program modules (542) may include the tools (252)-(258) as described in FIG. 1.

Host (502) may also communicate with one or more external devices (514), such as a keyboard, a pointing device, etc.; a display (524); one or more devices that enable a user to interact with host (502); and/or any devices (e.g., network card, modem, etc.) that enable host (502) to communicate with one or more other computing devices. Such communication can occur via Input/Output (I/O) interface(s) (522). Still yet, host (502) can communicate with one or more networks such as a local area network (LAN), a general wide area network (WAN), and/or a public network (e.g., the Internet) via network adapter (520). As depicted, network adapter (520) communicates with the other components of host (502) via bus (508). In one embodiment, a plurality of nodes of a distributed file system (not shown) is in communication with the host (502) via the I/O interface (522) or via the network adapter (520). It should be understood that although not shown, other hardware and/or software components could be used in conjunction with host (502). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (506), including RAM (530), cache (532), and storage system (534), such as a removable storage drive and a hard disk installed in a hard disk drive.

Computer programs (also called computer control logic) are stored in memory (506). Computer programs may also be received via a communication interface, such as network adapter (520). Such computer programs, when run, enable the computer system to perform the features of the present embodiments as discussed herein. In particular, the computer programs, when run, enable the processing unit (504) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (502) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
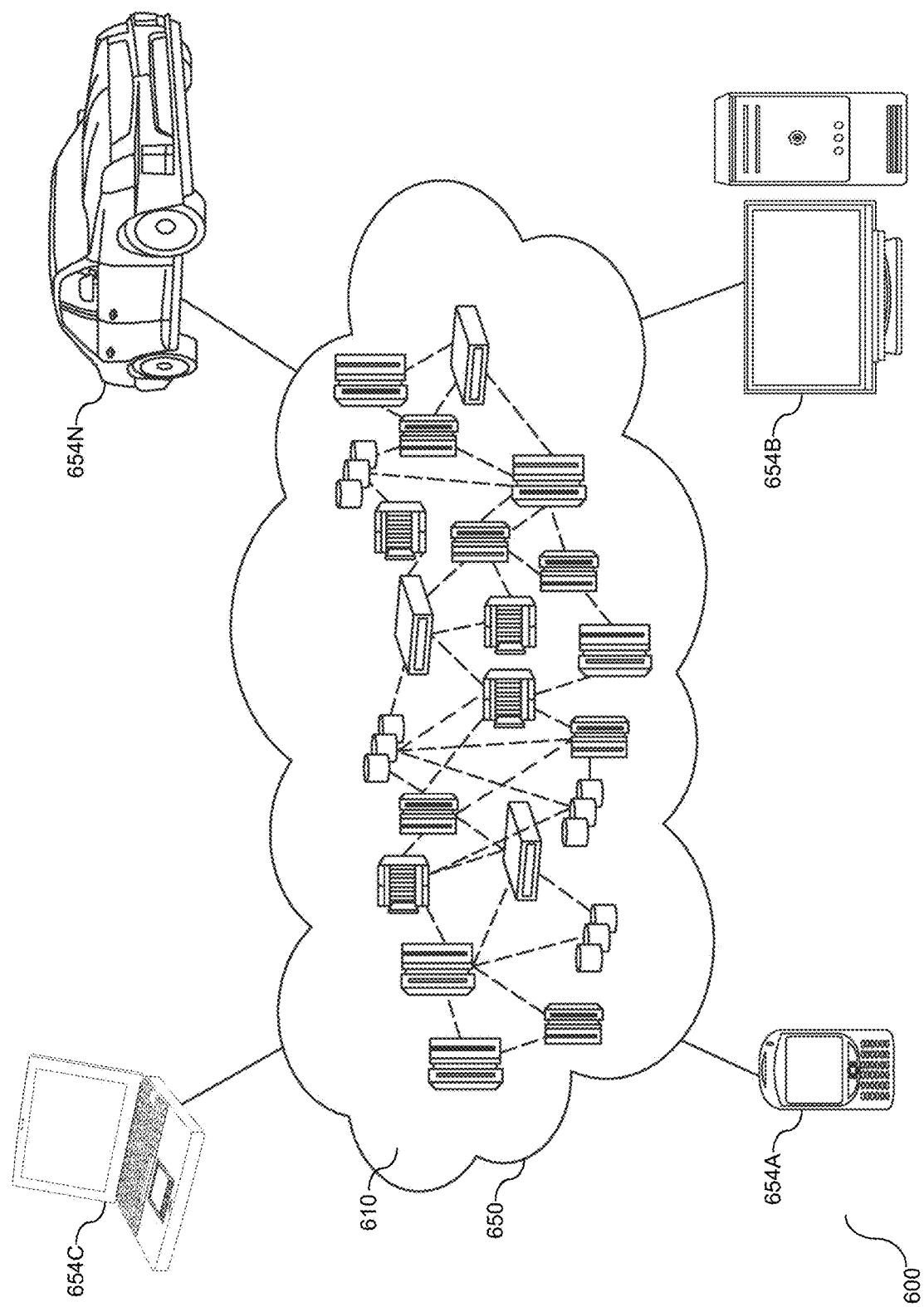
FIG. 6 depicts a block diagram illustrating a cloud computer environment.

Referring now to FIG. 6, an illustrative cloud computing network (600). As shown, cloud computing network (600) includes a cloud computing environment (650) having one or more cloud computing nodes (610) with which local computing devices used by cloud consumers may communicate. Examples of these local computing devices include, but are not limited to, personal digital assistant (PDA) or cellular telephone (654A), desktop computer (654B), laptop computer (654C), and/or automobile computer system (654N). Individual nodes within nodes (610) may further communicate with one another. They may be grouped (not shown) physically or virtually, in one or more networks, such as Private, Community, Public, or Hybrid clouds as described hereinabove, or a combination thereof. This allows cloud computing environment (600) to offer infrastructure, platforms and/or software as services for which a cloud consumer does not need to maintain resources on a local computing device. It is understood that the types of computing devices (654A-N) shown in FIG. 6 are intended to be illustrative only and that the cloud computing environment (650) can communicate with any type of computerized device over any type of network and/or network addressable connection (e.g., using a web browser).

Figure 7:
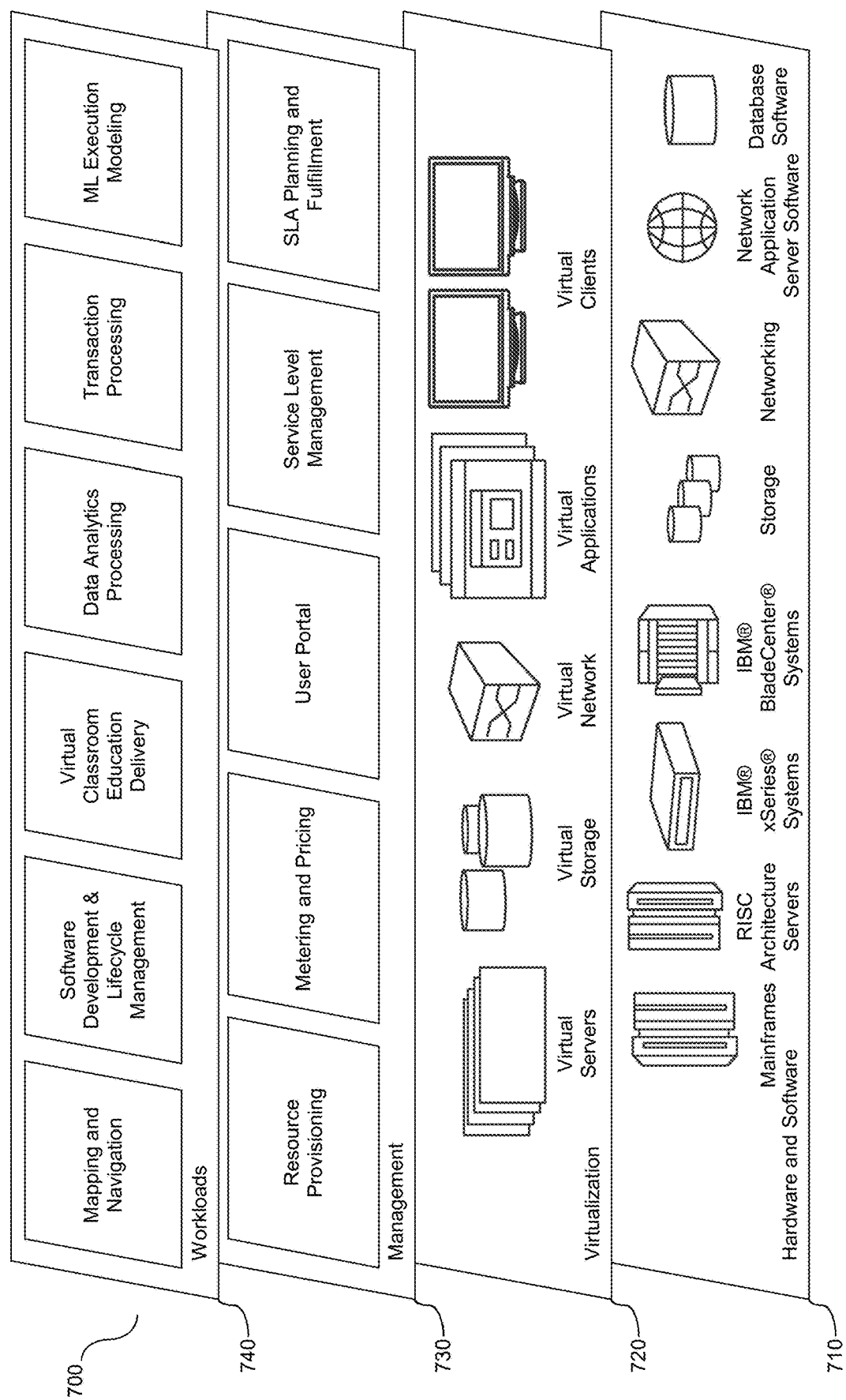
FIG. 7 depicts a block diagram illustrating a set of functional abstraction model layers provided by the cloud computing environment.

Referring now to FIG. 7, a set of functional abstraction layers (700) provided by the cloud computing network of FIG. 6 is shown. It should be understood in advance that the components, layers, and functions shown in FIG. 7 are intended to be illustrative only, and the embodiments are not limited thereto. As depicted, the following layers and corresponding functions are provided: hardware and software layer (710), virtualization layer (720), management layer (730), and workload layer (740).

The hardware and software layer (710) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (720) provides an abstraction layer from which the following examples of virtual entities may be provided: virtual servers; virtual storage; virtual networks, including virtual private networks; virtual applications and operating systems; and virtual clients.

In one example, management layer (730) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (740) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and ML execution modeling.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to model ML application execution and resource usage, including efficient and effective ML application performance and resource management.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, and functional programming languages, such as Haskell, Lisp, or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
   a processing unit; and
   memory operatively coupled to the processing unit, the memory storing instructions to cause the processing unit to apply artificial intelligence (AI) to:
   generate a profile comprising machine learning (ML) application execution information and resource usage data for one or more secondary ML applications;
   identify a plurality of features and/or signatures from the generated profile;
   build a primary ML execution model configured to correlate application execution performance with one or more computing resources;
   the primary ML model to leverage the identified plurality of features and/or signatures, wherein the primary ML execution model is configured to employ one or more ML techniques to assess one or more resource requirements for at least one of the one or more secondary ML applications and generate output to identify one or more computing resources to support execution of the one or more secondary ML applications;
   apply, by the primary ML execution model, one or more directives aligned with the generated output to elastically allocate and request one or more resources from a resource management component to at least one of the secondary ML applications to support application execution, wherein the primary ML execution model is configured to receive and apply an update from the generated profile and to subject the allocation to change during execution of the one or more secondary ML applications.

2. The computer system of claim 1, wherein elastic allocation includes configuring the ML execution model to execute a resource allocation action with respect to resource availability and support for application processing, the resource allocation action to reduce or expand any resource.

3. The computer system of claim 2, wherein the memory further comprises instructions to change computing allocation across iterations of the one or more secondary ML applications, including invoke the resource allocation action based on an application execution pattern and a resource usage pattern.

4. The computer system of claim 1, wherein the instructions to generate the profile further comprise instructions to monitor and collect resource usage data on one or more ML routines, and use the monitored data to predict allocation for the one or more secondary ML applications.

5. The computer system of claim 1, wherein the memory further comprises instructions to utilize one or more call-back functions to profile application execution with one or more application relevant parameters and profile resource usage information.

6. The computer system of claim 5, wherein the generated profile is collected for a distributed ML application in a distributed computing system.

7. The computer system of claim 1, wherein the plurality of features and/or signatures is derived with user input.

8. A computer program product to support elastic execution of a machine learning workload using application based profiling, the computer program product comprising: a computer readable storage medium having program code embodied therewith, the program code executable by a processor to:
   generate a profile comprising machine learning (ML) application execution information and resource usage data for one or more secondary ML applications;
   identify a plurality of features and/or signatures from the generated profile;
   build a primary ML execution model configured to correlated application execution performance with one or more computing resources;
   the primary ML model to leverage the identified plurality of features and/or signatures, wherein the primary ML execution model is is configured to employ one or more ML techniques to assess one or more resource requirements for at least one of the one or more secondary ML applications and generate output to identify one or more computing resources to support execution of the one or more secondary ML applications; and
   apply, by the primary ML execution model, one or more directives aligned with the generated output to elastically allocate and request one or more resources from a resource management component to at least one of the secondary ML applications to support application execution, wherein the primary ML execution model is configured to receive and apply an update from the generated profile and to subject the allocation to change during execution of the one or more secondary ML applications.

9. The computer program product of claim 8, wherein elastic allocation includes the program code executable by the processor to execute a resource allocation action with respect to resource availability and support for application processing, the resource allocation action to reduce or expand any resource.

10. The computer program product of claim 9, further comprising program code executable by the processor to change computing resource allocation across iterations of the one or more secondary ML applications, including invoke the resource allocation action based on an application execution pattern and a resource usage pattern.

11. The computer program product of claim 8, wherein the joint profile generation further comprises the program code executable by the processor to monitor and collect resource usage data on one or more ML routines, and use the monitored data to predict resource allocation for a future secondary ML application.

12. The computer program product of claim 8, wherein the program code to generate the profile further comprises program code executable by the processor to utilize one or more call-back functions to profile application execution with one or more application relevant parameters and profile resource usage information.

13. The computer program product of claim 12, wherein the generated profile is collected for a distributed secondary ML application in a distributed computing system.

14. The computer program product of claim 8, wherein the plurality of features and/or signatures is derived with user input.

15. A method comprising:
   generating, using a computer processor, a joint profile comprising machine learning (ML) application execution information and resource usage data for one or more secondary ML applications;

identifying, using the computer processor, a plurality of features and/or signatures from the generated profile;

building, using the computer processor, a primary ML execution model configured to correlate application execution performance with one or more computing resources;

the primary ML model configured to leverage the identified plurality of features and/or signatures, wherein the primary ML execution model is configured to employ one or more ML techniques assessing one or more resource requirements for at least one of the one or more secondary ML applications and generate output identifying computing resources to support execution of the one or more secondary ML applications; and applying, using the computer processor, by the primary ML execution model a directive aligned with the generated output, the directive application elastically allocating and requesting one or more resources from a resource management component to at least one of the secondary ML applications to support application execution, wherein the primary ML execution model is configured to receive and apply an update from the generated profile and to subject the allocation to change during execution of the one or more secondary ML applications.

16. The method of claim 15 wherein the elastically allocating includes executing a resource allocation action with respect to resource availability and support for application processing, the resource allocation action to reduce or expand any resources.

17. The method of claim 16, further comprising changing, using the computer processor, computing resource allocation across one or more iterations of the one or more secondary ML applications, including invoking the resource allocation action based on an application execution pattern and a resource usage pattern.

18. The method of claim 15, wherein generating the profile further comprises monitoring and collecting resource usage data on one or more ML routines, and using the monitored data to predict allocation for a future secondary ML application.

19. The method of claim 15, wherein generating the profile comprises utilizing one or more call-back functions to profile application execution with one or more application relevant parameters and profile resource usage information.

20. The method of claim 19, wherein the generated profile is collected for a distributed secondary ML application in a distributed computing system.

* * * * *